No. 672,831. Patented Apr. 23, 1901.
W. W. HOFFMAN & F. W. POWERS.
TROLLEY.
(Application filed Oct. 1, 1900.)
(No Model.) 2 Sheets—Sheet 1.
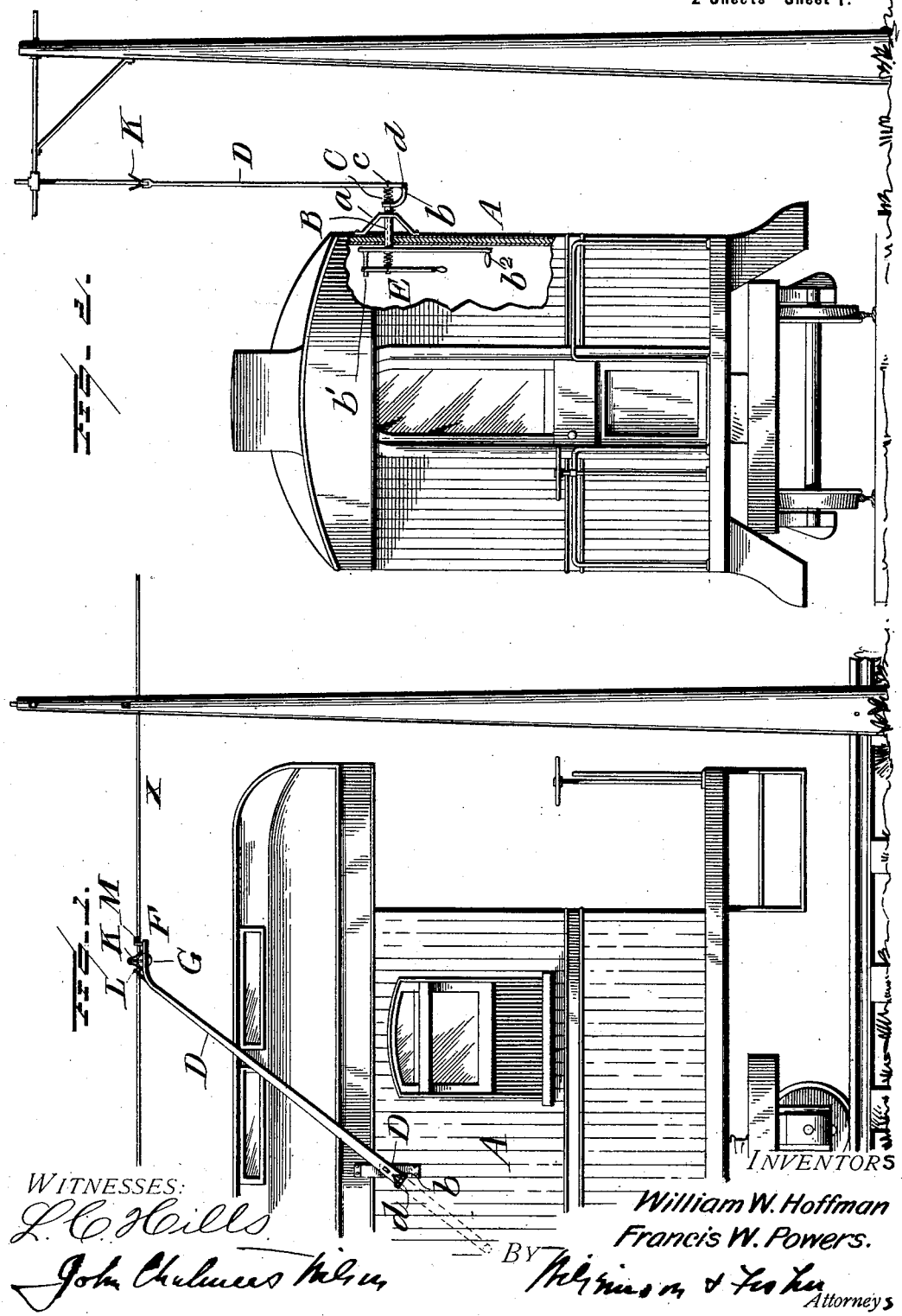
WITNESSES:
INVENTORS
William W. Hoffman
Francis W. Powers.
BY
Attorneys

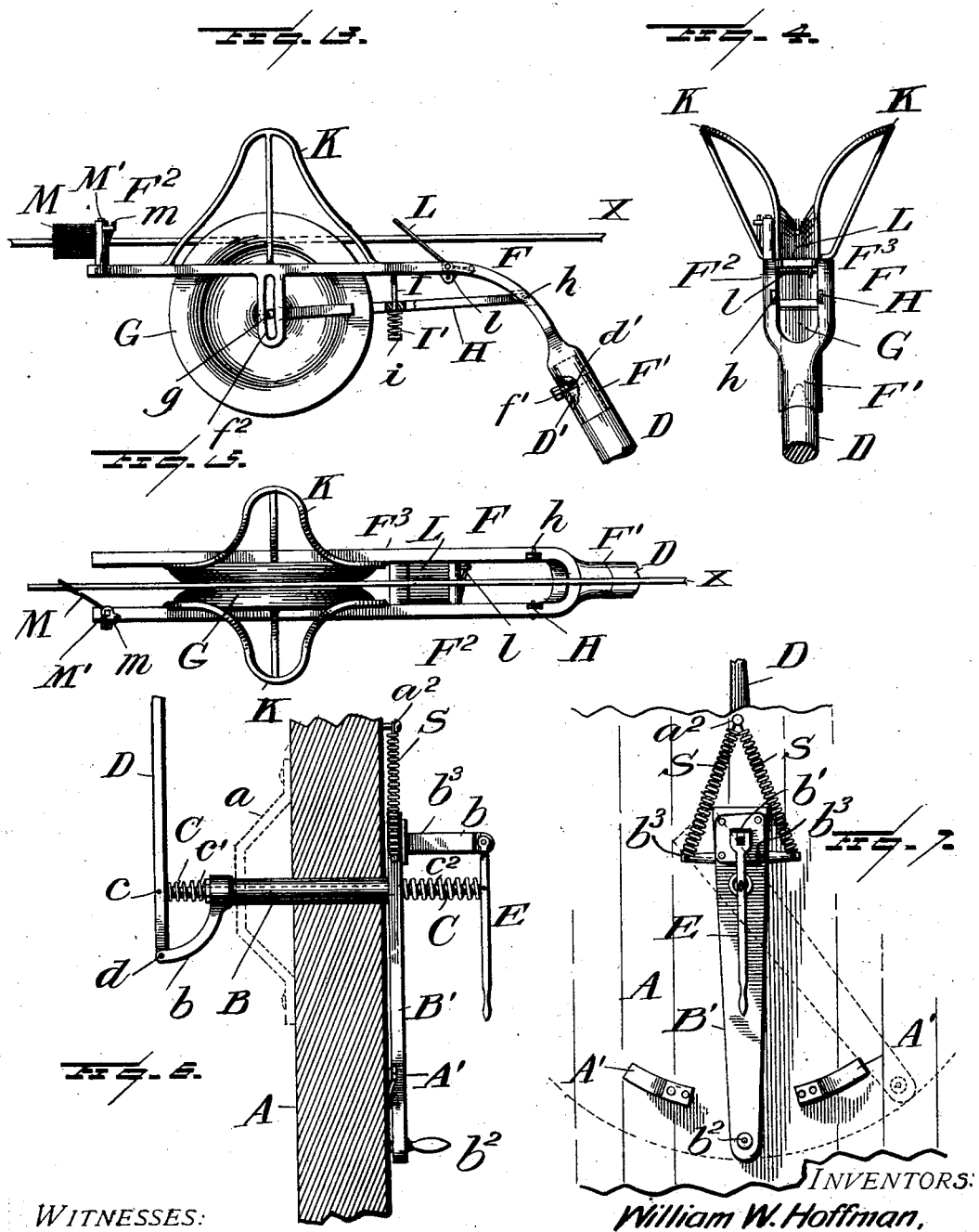

UNITED STATES PATENT OFFICE.

WILLIAM W. HOFFMAN AND FRANCIS W. POWERS, OF WEST LAFAYETTE, INDIANA.

TROLLEY.

SPECIFICATION forming part of Letters Patent No. 672,831, dated April 23, 1901.

Application filed October 1, 1900. Serial No. 31,680. (No model.)

*To all whom it may concern:*

Be it known that we, WILLIAM W. HOFFMAN and FRANCIS W. POWERS, citizens of the United States, residing at West Lafayette, in the county of Tippecanoe and State of Indiana, have invented certain new and useful Improvements in Trolleys; and we do hereby declare the following to be a full, clear, and exact description of the invention, such as will enable others skilled in the art to which it appertains to make and use the same.

Our invention relates to improvements in trolleys; and it consists of a trolley attached to the side of a car in such a manner as to be in control of a person on the inside of the car; and it further consists of a trolley-head formed of a light frame pivoted on the end of the trolley-pole and having the trolley-wheel flexibly secured therein, guards to prevent the wheel from leaving the wire, and brushes to secure constant electrical connection with the said wire.

Reference is had to the accompanying drawings, in which the same parts are designated by the same letters of reference throughout the several views, and in which—

Figure 1 represents a side elevation of a car with our improved trolley applied to the side thereof. Fig. 2 represents an end elevation, partly in section, of the same. Fig. 3 represents a side elevation of a trolley-head constructed in accordance with our invention. Fig. 4 represents a front view of the same. Fig. 5 represents a plan of the same. Fig. 6 is a section through one side of a car, showing the method of attaching the trolley thereto. Fig. 7 is an elevation of the devices upon the inside of the car for moving and controlling the position of the trolley.

Through one side of the car A and near the upper part thereof is arranged a hollow rock-shaft B, having a lever B' secured to its end inside of the car and extending in a direction opposite to the direction of the trolley-pole D on the outside of the car. To the end of the sleeve B outside of the car is attached a curved bifurcated arm $b$, between the outer ends of which is pivoted the lower end of the trolley-pole D, as at $d$. A rod C is arranged to extend through the sleeve B and is pivoted at its outer end to the trolley-pole D, as at $c$, and at its inner end to a hand-lever E, pivoted in a bracket $b'$ upon the end of the lever B' nearest its connection with the sleeve B. Springs $c'$ and $c^2$ are placed upon the rod C and press upon opposite ends of the sleeve B. The spring $c'$ is arranged between the outer end of the sleeve B and the trolley-pole D and tends to push the latter away from the side of the car, and the spring $c^2$ is arranged between the inner end of the sleeve B and the lever E and tends to push the latter toward the inside of the car and to pull the rod C (which is attached to the lever E and to the trolley-pole D) inwardly in opposition to the tendency of the spring $c'$. The relative strength of the spring $c'$ to the spring $c^2$ is so proportioned as to hold the trolley-pole D in a plane substantially parallel to the side of the car A.

By moving the hand-lever E inwardly or outwardly the rod C will be moved longitudinally through the sleeve B, thus moving the trolley-pole toward or away from the side of the car.

The lever B' is provided with a handle $b^2$, by which the said lever and sleeve B may be turned to raise or lower the said trolley-pole. The outer end of the sleeve B may be supported in a bracket $a$. (Shown in dotted lines in Fig. 6.)

Any suitable spring may be used to keep the trolley pressed upward against the wire. In Figs. 6 and 7 we have shown a pair of springs S, connected at one end to studs $b^3$ on the upper part of the lever B' and at their upper ends to a stud $a^2$ on the inside of the car, directly above the shaft B. The tendency of these springs will be to pull the trolley upwardly no matter which way it may be depressed.

Spring-stops A' A' are secured to the inside of the car in such position as to hold the lever B' in the position shown in dotted lines in Fig. 7 and prevent the trolley-pole from assuming a vertical position should the trolley-wheel leave the wire. These stops are so placed that they will allow the trolley to press against the wire at all times, but will only allow it to rise a very little higher than the wire.

The trolley-head is mounted upon a frame

F, having a socket F', which fits over the reduced upper end D' of the trolley-pole D and is held thereon by a set-screw $f'$, which enters an annular groove $d'$ in the said reduced portion of the trolley-pole D, thus allowing the frame F to turn upon the pole.

The frame F consists of two side pieces $F^2$ and $F^3$, arranged parallel with each other and a short distance apart. Each of the said pieces is provided with a depending slotted lug $f^2$.

The trolley-wheel G is supported in a frame H, which is pivoted, as at $h$, between the arms $F^2$ and $F^3$, and the axle $g$ of the trolley-wheel extends through the side pieces of the frame H into the slots in the lugs $f^2$, which guides the wheel in its vertical motion.

A rod I extends downwardly from the frame F through a part of the frame H and is provided with a head $i$ on its lower end. A spring I' is placed on the rod I between the head and the lower side of the frame H and serves to press the said frame and trolley-wheel upwardly.

Skeleton frames K K are secured upon the side pieces $F^2$ $F^3$ of the frame F, one on each side of the trolley-wheel G, and these frames are flared laterally above the trolley-wheel, thus forming flaring guards, which assist in placing the trolley upon the wire X and also prevent the wheel from leaving the wire.

A brush L is pivoted in the frame F in front of the trolley-wheel and is held against the wire X by a spring $l$, the tendency of which spring is to keep the brush in a vertical position, so that it will drag along the under side of the wire when the trolley is moving in either direction.

On the rear end of one of the side pieces, as $F^2$, is secured a vertical stud M', upon which is pivoted a brush M, which is held against the wire X by a spring $m$, the tendency of which spring is to turn the brush to a position at right angles to the side piece $F^2$ and pointing toward the side piece $F^3$, thus causing the said brush to press against the wire X on either side of the stud M'.

From the foregoing it will be seen that we provide a trolley having three points of contact with the wire—the wheel G, the brush L in front of the wheel, and the brush M in rear of the wheel—thus insuring a constant electrical connection with the wire at all times and at any speed at which the car may be traveling.

Having thus described our invention, what we claim, and desire to secure by Letters Patent of the United States, is—

1. In a trolley, the combination with a trolley-pole, and a frame mounted to turn on said pole; of a second frame pivoted beneath the first frame, and a trolley-wheel journaled in the second frame and projecting through the first frame and means for holding said trolley-wheel against the wire, substantially as described.

2. In a trolley, the combination with a trolley-pole; a frame mounted to turn on said pole, and guideways depending from said frame; of a second frame pivoted beneath the first frame, and a trolley-wheel journaled in the second frame and guided in the guideways in the first frame, substantially as described.

3. In a trolley, the combination with a trolley-pole; a frame mounted to turn on said pole, and guideways depending from said frame; of a second frame pivoted beneath the first frame; a spring tending to raise the second frame, and a trolley-wheel journaled in the second frame and guided in the first frame, substantially as described.

4. In a trolley, the combination with a trolley-pole, a frame mounted on said pole, guideways depending from said frame and flaring guards on said frame; of a second frame pivoted beneath the first frame, a trolley-wheel journaled in the second frame and guided in the guideways of the first frame, and means for pressing the said wheel against the wire, substantially as described.

5. In a trolley, the combination with a frame connected with a moving vehicle, a brush mounted on each end of said frame, and means for pressing said brushes against a conducting-wire; of a second frame pivoted in the first frame, and a trolley-wheel journaled in the second frame and guided in the first, substantially as described.

6. In a trolley, the combination with a frame connected with a moving vehicle, depending guideways in said frame, a brush mounted on each end of said frame, and means for pressing said brushes against a conducting-wire; of a second frame pivoted beneath the first frame, a trolley-wheel pivoted in the second frame, and guided in the guideways of the first frame, and means for pressing the said trolley-wheel against the wire; substantially as described.

7. In a trolley, the combination with a frame connected with a moving vehicle, upward-flaring guards on said frame, a brush mounted on each end of said frame, and means for pressing said brushes against a conducting-wire; of a second frame pivoted beneath the first frame, and a trolley-wheel journaled in the second frame and guided in the first frame; substantially as described.

8. The combination with a moving vehicle, of a trolley arranged to run along an electric conductor, outside of said vehicle; a hollow rock-shaft extending through the side of said vehicle; a second shaft passing through the said hollow shaft and connecting with the trolley-arm; a lever connected to the said shaft; springs on the ends of the rocking shaft acting upon the trolley-arm to retain it in position, springs for holding the trolley against the conductor, and stops to limit the upward play of the trolley, substantially as described.

9. The combination with a moving vehicle;

of a trolley arranged to move along an electric conductor outside of said vehicle, a hollow rock-shaft to which said trolley is pivoted, said rock-shaft extending through the side of the said vehicle, a lever B' on said hollow shaft within said vehicle, a second shaft C passing through said hollow shaft, and connected with said trolley, a lever E pivoted to the lever B', and connected with the shaft C, and springs on the ends of the shaft C acting upon the trolley to retain it in position, substantially as described.

In testimony whereof we affix our signatures in presence of two witnesses.

WILLIAM W. HOFFMAN.
FRANCIS W. POWERS.

Witnesses:
HERMAN ROTH,
JOHN W. McBEE.